United States Patent
Eberlein et al.

(10) Patent No.: US 10,437,795 B2
(45) Date of Patent: Oct. 8, 2019

(54) UPGRADING SYSTEMS WITH CHANGING CONSTRAINTS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 15/593,830

(22) Filed: May 12, 2017

(65) Prior Publication Data

US 2018/0329930 A1    Nov. 15, 2018

(51) Int. Cl.
*G06F 17/30* (2006.01)
*G06F 16/21* (2019.01)
*G06F 8/65* (2018.01)
*G06F 16/23* (2019.01)

(52) U.S. Cl.
CPC .............. *G06F 16/212* (2019.01); *G06F 8/65* (2013.01); *G06F 16/2365* (2019.01)

(58) Field of Classification Search
CPC ....................................................... G06F 7/00
USPC ........................................................ 707/695
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |

(Continued)

OTHER PUBLICATIONS

U.S. Appl. No. 14/960,983, filed Dec. 7, 2015, Eberlein, et al.

(Continued)

*Primary Examiner* — Baoquoc N To
(74) *Attorney, Agent, or Firm* — Fish & Richardson P.C.

(57) ABSTRACT

Methods, systems, and computer-readable storage media for determining at least one constraint that is to be changed as a result of a maintenance procedure that is to be performed on an application that interacts with a database system, identifying a data value of a table stored in the database as violating the at least one constraint, the table having a start release structure, moving a data object including the data value to a quarantine table that include the start release structure, editing the data value within the quarantine table to provide an edited data value that does not violate the at least one constraint, and moving the data object including the edited data value to the table, after the maintenance procedure has been performed.

20 Claims, 10 Drawing Sheets

(56) References Cited

U.S. PATENT DOCUMENTS

| | | |
|---|---|---|
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2005/0131870 A1* | 6/2005 | Krishnaswamy ......... G06F 8/71 |
| 2008/0120129 A1 | 5/2008 | Seubert et al. |
| 2010/0153341 A1 | 6/2010 | Driesen et al. |
| 2010/0161648 A1 | 6/2010 | Eberlein et al. |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2015/0219117 A1 | 8/2015 | Heli |
| 2017/0025441 A1 | 1/2017 | Mori |
| 2017/0139596 A1 | 5/2017 | Hack |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
Office Action for related U.S. Appl. No. 15/593,781 dated May 31, 2018; 11 pages.

* cited by examiner

MATERIAL_FLOW — 300

| EVENT_ID | SEQ | OPERATION | QUANTITY | MASTER_ID | MATERIAL_SHORT |
|---|---|---|---|---|---|
| CHAR 2 | INT | CHAR 3 | CHAR 10 | CHAR 3 | CHAR 32 |
| E1 | 1 | IN | 100 | 12 | BALLPEN 1 |
| E1 | 2 | IN | *5 0* | 13 | PAPER A4 |
| E2 | 1 | OUT | 2 | 13 | PAPER A4 |
| E3 | 1 | OUT | *E* | 12 | BALLPEN1 |
| E3 | 2 | OUT | 5 | 13 | PAPER A4 |
| E4 | 1 | IN | 100 | 15 | PAPER A3 |
| E4 | 2 | IN | 50 | 17 | ENVELOPE C6 |
| E4 | 3 | IN | 50 | 15 | PAPER A3 |
| E5 | 1 | OUT | " " | 18 | ENVELOPE C5 |

MATERIAL_FLOW — 300'

| EVENT_ID | SEQ | OPERATION | QUANTITY | MASTER_ID | MATERIAL_SHORT |
|---|---|---|---|---|---|
| CHAR2 | INT | CHAR3 | INT | CHAR3 | CHAR32 |
| E1 | 1 | IN | 100 | 12 | BALLPEN 1 |
| E2 | 1 | OUT | 2 | 13 | PAPER A4 |
| E3 | 2 | OUT | 5 | 13 | PAPER A4 |
| E4 | 1 | IN | 100 | 15 | PAPER A3 |
| E4 | 2 | IN | 50 | 17 | ENVELOPE C6 |
| E4 | 3 | IN | 50 | 15 | PAPER A3 |

302 304 306 308' 310 312

MATERIAL_FLOW — 320

| EVENT_ID | SEQ | OPERATION | QUANTITY | MASTER_ID | MATERIAL_SHORT |
|---|---|---|---|---|---|
| CHAR2 | INT | CHAR3 | CHAR10 | CHAR3 | CHAR32 |
| E1 | 2 | IN | 5 0 | 13 | PAPER A4 |
| E3 | 1 | OUT | E | 12 | BALLPEN1 |
| E5 | 1 | OUT | " " | 18 | ENVELOPE C5 |

| MATERIAL_FLOW | | | | | |
|---|---|---|---|---|---|
| EVENT_ID | SEQ | OPERATION | QUANTITY | MASTER_ID | MATERIAL_SHORT |
| CHAR2 | INT | CHAR3 | INT | CHAR3 | CHAR32 |
| E1 | 1 | IN | 100 | 12 | BALLPEN 1 |
| E1 | 2 | IN | 50 | 13 | PAPER A4 |
| E2 | 1 | OUT | 2 | 13 | PAPER A4 |
| E3 | 1 | OUT | 3 | 12 | BALLPEN1 |
| E3 | 2 | OUT | 5 | 13 | PAPER A4 |
| E4 | 1 | IN | 100 | 15 | PAPER A3 |
| E4 | 2 | IN | 50 | 17 | ENVELOPE C6 |
| E4 | 3 | IN | 50 | 15 | PAPER A3 |
| E5 | 1 | OUT | 0 | 18 | ENVELOPE C5 |

FIG. 3C

UPGRADING SYSTEMS WITH CHANGING CONSTRAINTS

BACKGROUND

Enterprise systems can include multiple systems that access data stored in an underlying database system. For example, an application executing on an application server can interact with the database system to access data stored therein. In some examples, data is stored in the database system based on a data model. The application, however, undergoes lifecycle management, which can include maintenance procedures, such as upgrading the application (e.g., from a first version (V1) to a second version (V2)). Such maintenance procedures can result in data model changes, which can include, for example, constraint changes. When changing the data model, however, the existing data (e.g., data already stored in the database) can violate the new constraints, for example. Consequently, during the change (e.g. upgrade) the new constraint cannot be created, and the change (e.g. upgrade) cannot be completed.

SUMMARY

Implementations of the present disclosure include computer-implemented methods for supporting maintenance procedures that include constraint changes. In some implementations, actions include determining, by a computer-implemented deploy tool that deploys maintenance procedures in a database system, at least one constraint that is to be changed as a result of a maintenance procedure that is to be performed on an application that interacts with the database system, identifying, by the deploy tool, a data value of a table stored in the database as violating the at least one constraint, the table having a start release structure, moving, by the deploy tool, a data object including the data value to a quarantine table that include the start release structure, editing the data value within the quarantine table to provide an edited data value that does not violate the at least one constraint, and moving the data object including the edited data value to the table, after the maintenance procedure has been performed. Other implementations of this aspect include corresponding systems, apparatus, and computer programs, configured to perform the actions of the methods, encoded on computer storage devices.

These and other implementations can each optionally include one or more of the following features: the at least one constraint includes one of a data type constraint, and a foreign key constraint; editing the data value is automatically executed at least partially based on a manual edit to another data value performed by a user; moving a data object to a quarantine table, and editing the data value within the quarantine value are performed after the maintenance procedure is completed, and the application and database system are in production use; the at least one constraint results from a change to a data model that defines interactions between the application and the database system; the maintenance procedure includes an upgrade procedure to upgrade the application from a first version to a second version; and actions further comprise deleting the quarantine table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict example tables in accordance with implementations of the present disclosure.

Like reference symbols in the various drawings indicate like elements.

DETAILED DESCRIPTION

Implementations of the present disclosure are generally directed to supporting maintenance procedures that include constraint changes. More particularly, implementations of the present disclosure are directed to providing one or more quarantine tables to temporarily hold data values that would be inconsistent with at least one constraint change resulting from a maintenance procedure. In accordance with the present disclosure, a system can be brought back online for production use after the maintenance procedure, while the quarantine tables are used to edit data values for data that are inconsistent with constraints.

Implementations can include actions of determining, by a computer-implemented deploy tool that deploys maintenance procedures in a database system, at least one constraint that is to be changed as a result of a maintenance procedure that is to be performed on an application that interacts with a database system, identifying, by the deploy tool, a data value of a table stored in the database as violating the at least one constraint, the table having a start release structure, moving, by the deploy tool, a data object including the data value to a quarantine table that include the start release structure, editing the data value within the quarantine table to provide an edited data value that does not violate the at least one constraint, and moving the data object including the edited data value to the table, after the maintenance procedure has been performed.

Figure 1:
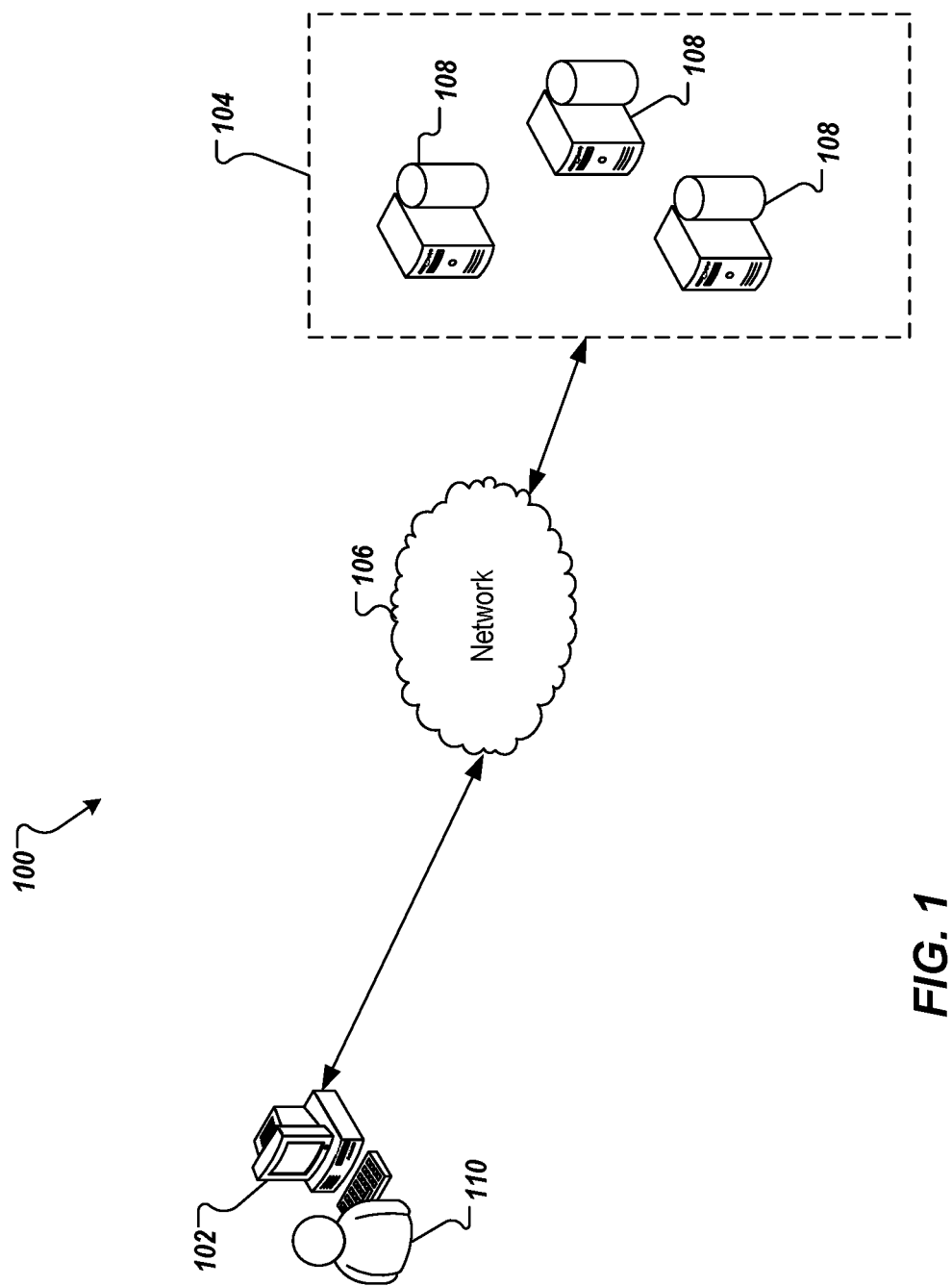
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an application (e.g., provided as one or more computer-executable programs executed by one or more computing devices), and one or more database systems. For example, input data can be provided to the server system (e.g., from the client device 102), and the server system can process the input data through the application, which can query the database system to interact with data stored therein.

An example database system includes the in-memory SAP HANA database system provided by SAP SE of Walldorf, Germany. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

As introduced above, implementations of the present disclosure are directed to supporting maintenance procedures that include constraint changes. In general, when changing a constraint in a data model, existing data can violate the new constraints. For example, during a maintenance procedure (e.g. upgrade) the constraint cannot be created, if the existing data violates the constraint. Therefore, the maintenance procedure cannot be completed.

To address such scenarios, one approach includes a stop procedure, during which table content is adjusted ad-hoc, and the maintenance procedure resumes after adjustment. More particularly, the maintenance procedure will stop when the new constraint is to be created, and an abort with an error message is issued. Because the system cannot be brought back online (into production) without the constraint, the data violating the constraint needs to be adjusted. After adjustment, the procedure can be continued. A problem of such an approach is that the system is in an intermediary state at this point, and likely will not start or run correctly. The change is typically performed and/or monitored by an administrator, who can only identify the violating data values, but will not likely be able to adjust the data values (e.g., the administrator may be unaware of the semantic context for the data). This approach takes some time, downtime resulting in prolonged downtime of the system, and is not mass operation-/cloud-ready.

Another approach includes a stop procedure, restore before constraint violation, adjust content, and restart. More particularly, the maintenance procedure stops when the constraint is to be created, and an abort with an error message is issued. Because the system cannot be brought back online without the constraint, the system has to be restored to the before the constraint violation. Again, the change is typically performed and/or monitored by an administrator, who can only identify the violating data values, but will not likely be able to adjust the data values (e.g., the administrator may be unaware of the semantic context for the data). There may be several constraint violating records, and more than one constraint which is changed, and which can run into errors upon creation. Consequently, this approach can be cumbersome, as it needs to be repeated over and over again. Further, this approach is not mass operation-/cloud-ready.

Another approach includes automatic deletion of violating content. More particularly, the content (data values) violating the constraint is deleted. The constraint creation is repeated. This process can be performed by an application on the target release. This approach, however, is not practical in that it results in data loss. Further, it is unclear, whether the data violating the constraint is erroneous, or if the missing entry in the other table is the error. The record, which needs to be deleted can be required for other records, which then would have to also be deleted.

Still another approach includes ad-hoc creation of missing content. More particularly, the creation of the constraint is interrupted. The missing key entries, for example, are identified and created automatically. Then the creation of the constraint is retried. This process is performed by an application on the target release. However, the newly created data will likely not be fully specified, and has to be manually post-processed. Further, it needs to be determined, which data to create. For example, if only one field is known to be missing (the one of the constraint), it has to be determined which data to enter into the other fields. Further, the referenced table will likely not be stand-alone, but also part of a data model (e.g., that relates multiple tables). Consequently, thus records in several tables may be required, and an application program interface (API) to create consistent data. Even then, the question remains, as to whether the new record is desired, or is an existing record is desired.

Another approach includes a pre-flight-check. More particularly, before the change starts, the content is adjusted to match the new constraint(s). This is performed by an application on the start release, ideally during uptime (production use), and on a delta in downtime. However, this may not account for all changes to result from the maintenance procedure (e.g., if the new data structures are required to define the new constraints). If run online during operation of the system, additional violating content may be created at any time. Consequently, this approach would also require a final clean-up run in downtime.

Still another approach includes a multi-step maintenance procedure, in which a new constraint is not created in the first change, first, the boundary conditions are created, the content is enforced by higher level software, then the change with the constraint is deployed. In the intermediary version, the structures are final, the constraints are enforced by software, and a workflow can be deployed to identify erroneous content that can be adjusted by a user. Once all content is adjusted, the next version can be deployed. However, in the time period between the two upgrade steps, the systems operates on invalid data. If the new application version relies on correctly applied constraints, for example, to perform operations (e.g., cascade delete), then an error may be introduced, and data can be further corrupted. Customers tend to ask for "jump-upgrades" without intermediary versions, directly from version x (e.g., V1) directly to version x+n (e.g., V2), without intermediary landings at version x+(n−1) (e.g., V1.1). This makes it impossible to separate the upgrade into exactly two steps.

The present disclosure provides implementations that address deficiencies of the above-discussed approaches. More particularly, implementations of the present disclosure provide one or more quarantine tables to temporarily hold data values that would be inconsistent with at least one constraint change resulting from a maintenance procedure. For example, and as described in detail herein, prior to executing a maintenance procedure, one or more tables affected by the maintenance procedure can be determined. For each table, it can be determined whether a constraint that would result from the maintenance procedure would be violated. For any such violations, a quarantine table is created, and data objects including data values of a table are copied to the quarantine table, and are removed from the table. The maintenance procedure is executed, and the system is brought back online (back into production use). The data values stored in the tables are able to be accessed by the system, while the to-be-edited data values in the quarantine tables are unable to be accessed by the system. The data values of the quarantine table are edited, and are copied back to the tables. Accordingly, implementations of the present disclosure enable the system can be brought back online for production use after the maintenance procedure, thereby minimizing downtime, while the quarantine tables are used to edit data values for data that would be inconsistent with post-maintenance procedure constraints.

Implementations of the present disclosure are described in further detail with reference to an upgrade procedure, in which an application is upgraded from a first version (V1) to a second version (V2), the upgrade procedure resulting in a change in a data model (e.g., table structure, deployment of content). It is contemplated, however, that implementations of the present disclosure can be realized in any appropriate context (e.g., other maintenance procedures). Further, implementations of the present disclosure are described in further detail herein with reference to example constraints, and respective changes thereto. Example constraints include a data type constraint, and a foreign key constraint (FKC). It is contemplated, however, that implementations of the present disclosure can be realized with any appropriate constraint.

Figure 2:
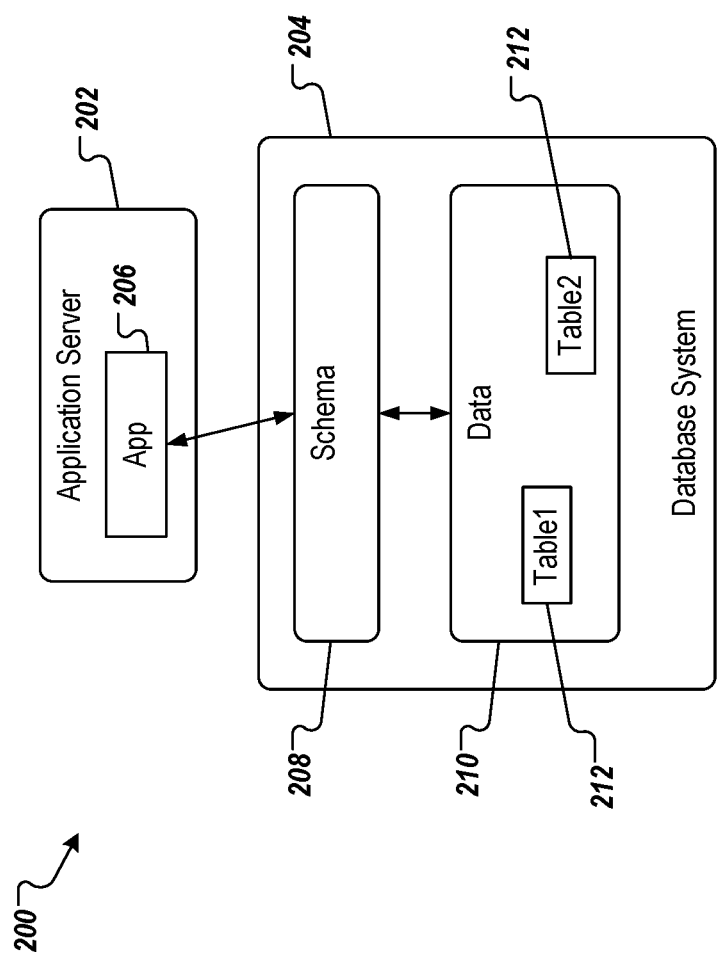
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture includes an application server 202, and a database system 204. The application server 202 hosts an application 206 that communicates with the database system 204 to interact with data 210 stored therein. More particularly, the application 206 communicates with a schema 208, which coordinates interactions with the data 210. For example, the schema 208 can define one or more views into tables 212.

In this example, data is stored in the tables 212. Example tables can include column-oriented tables, which store data in columns, each column having a respective data type associated therewith. Each data value stored in a column must be of the data type assigned to the column. Hence, the data type assigned to a column can be considered a constraint. In some examples, multiple tables can be related to each other through a FKC. A FKC can be described as a field (e.g., column) in one table that uniquely identifies a row of another table.

Although not depicted in FIG. 2, a computer-implemented deploy tool can deploy (execute) maintenance procedures to the application server 202, and the database system 204. In some implementations, the computer-implemented deploy tool performs one or more actions, as described herein.

In accordance with implementations of the present disclosure, the application 206 can undergo a maintenance procedure, which results in a change to one or more constraints. For example, the application 206 can undergo an upgrade from a first version (V1) to a second version (V2), which results in a data type of a column being changed, and/or a foreign key constraint being changed. In some examples, data that is stored in a table prior to the upgrade may violate the post-upgrade constraint. Prior to implementations of the present disclosure, this required prolonged downtime, and inefficient use of computing resources to complete the upgrade.

As described in further detail herein, implementations of the present disclosure address at least this issue by introducing so-called quarantine tables that can store data violating post-upgrade constraints, such that the upgrade procedure can be completed, and the system brought back online (for production use) more quickly than traditional processes could achieve. Implementations of the present disclosure are described in further detail below with reference to example tables, and example constraints.

An example constraint can include a table constraint:

```
<table_constraint> ::= <unique_constraint_definition>
                     | <referential_constraint_definition>
                     | <check_ constraint_definition>
```

In some examples, a unique constraint can include adding a new unique key constraint to an existing table. In some examples, a referential constraint can include: adding a new column with a constraint to an existing table (e.g. a new reference to existing master data); adding a constraint for an association, which had been in use, the constraint had been "intended" but not enforced in the database up to now, and the constraint is added to overcome problems with content violating the intended constraint; and a new data model that has constraints on the database. An example check constraint can include:

<check_constraint_definition>::=CHECK (<search_condition>)

In some examples, a table check constraint is satisfied if <search_condition> evaluates to true.

An example constraint can also include column constraints:

```
<column_constraint> ::= NULL
                      | NOT NULL
                      | [<constraint_name_definition>]
                        <unique_specification>
                      | [<constraint_name_definition>]
                        <references_specification>
<unique_specification> ::= UNIQUE | PRIMARY KEY
```

Another example constraint can include a data type constraint. For example, changing a data type of a field to a data type with stronger constraint on the data (e.g. CHAR→INT), or length of a field (CHAR30→CHAR20). For converting data types, rules are defined by the database, which conversion of type one to type two is guaranteed to work, and which type conversion only works in certain cases (i.e. the content fits).

A persistency example can be considered, where T1=Header, T2=Item, and a FKC is depicted as "4" (the foreign key arrow points from the referenced object to the referencing object) (e.g. T1→T2, Header→Item). In this example, T2 is considered "referencing," and T1 is considered "referenced." The FKC is created on the table T2 or Item. Another example is the referencing of master data: Master-Data→Transactional-Data, where T3=Master-Data, and T1, T2=Transactional Data.

As introduced above, issues can arise when constraints are to be changed (e.g., as a result of a maintenance procedure). For example, instead of altering a constraint, a database system deletes an original constraint, and adds a new constraint in its place. With regard to table constraints, an example scenario includes: two tables are defined T1 and T2, which have a constraint "→"; and the constraint is changed "→$^{new}$". The maintenance procedure (e.g., upgrade) sequence would be: T1 and T2 are in use, T1→T2 constraint is active; the old constraint is deleted "→"; the new constraint "→$^{new}$" is created (T1→$^{new}$T2). The new constraint can have other enforcements on content.

In some database systems, there is an alter command for changing the data type of a field (e.g. CHAR→INT), or length of a field (CHAR30→CHAR20). If there are rows in the table for which one or more data values in the altered column does not match the constraint (e.g. data is "abc123" but new constraint requires data type INT), the altered constraint cannot be implemented.

Accordingly, and as introduced above, implementations of the present disclosure provide a quarantine table. In some implementations, the quarantine table has the same structure as the start release (pre-constraint change) table. In this manner, the existing data values that would otherwise violate the constraint can be copied to the quarantine table. In some implementations, for tables, where the FKCs are to be changed, an empty copy of the tables is created. For example, for T1→T2, respective quarantine tables T1_q and T2_q (as empty clone of T1 and T2) are created with the start release structure. In some implementations, it is determined whether the content of T$_1$ and T2 fits to the new persistency definition (structure and constraints). A transformation is performed on each record in a table (e.g. for shortening data fields), or for object instances, which are potentially stored in a normalized database representation using several tables. The data field content and constraints defined in the target are verified.

In accordance with implementations of the present disclosure, original data values that do not fit to the new structure and constraint are moved. For example, if a data value violates structure or constraint, the data value is moved from the original table T to T_q. If an object is stored in tables Ta, Tb, Tc, three quarantine tables are created and the entries of the three tables are moved (e.g., Ta to Ta_q, Tb to Tb_q and Tc to Tc_q).

In some examples, actions can be optimized to work in a bulk uptime and incremental downtime approach. For example, all content is checked for future constraint violation in uptime (e.g., while the original version (start release, V1) application is in production use, and data records are marked (e.g., in the T_q tables), if they would violate a constraint of the target release (V2) application. The maintenance procedure can be initiated, which will result in a period of downtime (e.g., the application is offline and unavailable for production use). During the downtime, content altered since the last bulk or incremental run is checked again for potential constraint violation. Any data objects that have data values that would violate a to-be-changed constraint are moved to the quarantine table (from T to T_q). The old constraint (e.g., of V1) is dropped, and the new constraint (e.g., of V2) is adopted as part of the maintenance procedure.

In some instances, moving data in single tables to a quarantine table can violate data model consistency, if the data model includes more than one table. Accordingly, implementations of the present disclosure identify associations between tables, and move application defined objects, not only single table entries. This information is only partly available from the database structure and association definition. In some implementations, complete data objects are read from the original table, are written to the quarantine table, and are deleted from the original table. Further, complete data objects are transformed to the new structure to verify the target constraints.

At a high-level, implementations of the present disclosure provide multiple persistencies (tables): the target persistency, and the quarantine persistency. The quarantine persistency can have the start release version differing from target release version. Implementations provide a migration module, which can transform start release version entries to target release version entries. Implementations further provide a user interface (UI), through which content in quarantine table(s) can be handled. In some examples, the UI provides a list of content in quarantine tables (e.g., data objects of various types). A user can interact with the database system through the UI to, for example, navigate to a corresponding single object maintenance UI (MUI), matching to the target version tables related to the quarantine tables. In some examples, the single object MUI displays the start release content transformed, and presented in target release structure with potential violations. For example, violations are highlighted (e.g. a content is too long for a field). The regular data entry UIs of the application can be extended to be able to read data in the old format from the quarantine tables, and move this data to the new tables once the user performs edits. In some examples, data can be pre-filled in the MUI with values from the quarantine table(s). Other capabilities can include defining a template for data sets, copying data sets, and checking new data sets for consistency before insert. In some examples, search (e.g., fuzzy search) capabilities can be provided. For example, a full text index can be created on the persistency, and can be used to search for data values (e.g., sear using regular expressions). For example, a search can be performed for similar content in the target persistency, which can enable the user to edit data values in bulk.

Implementations of the present disclosure are described in further detail with reference to example start release, target release, and quarantine tables, as depicted in FIGS. 3A-4C.

FIGS. 3A-3C depict example tables in accordance with implementations of the present disclosure. With particular reference to FIG. 3A, an example table 300 (start release) is provided, and includes columns 302, 304, 306, 308, 310, 312. Each column 302, 304, 306, 308, 310, 312 includes a respective data type. For example, column 302 includes a character limited to 2 characters (CHAR2) data type, column 304 includes an integer (INT) data type, column 306 includes a character limited to 3 characters (CHAR3) data type, column 308 includes a character limited to 10 characters (CHAR10) data type, column 310 includes a character limited to 3 characters (CHAR3) data type, and column 312 includes a character limited to 32 characters (CHAR32) data type.

It can be determined that an application that interacts with the database system, within which the table 300 is stored is to undergo a maintenance procedure that would result in the datatype of the column 306 being changed from CHAR10 to INT. For example, the application can be upgraded to perform mathematical operations on the data that is to be stored in the column 308. In view of this, the data values stored in column 308 can be reviewed to determine whether any of the data values would violate the data type, once changed. In the example of FIG. 3A, it is determined that rows 314, 316, 318 each include data values stored in column 308 that would violate the data type, once changed. That is, each of the data values stored in column 308 of rows 314, 316, 318 are non-integers, and would therefore, violate the data type when changed to INT. Consequently, and in accordance with implementations of the present disclosure, a quarantine table can be provided.

FIG. 3B depicts an example quarantine table 320. In some implementations, the quarantine table is created, and mirrors the structure of the original table 300 (of FIG. 3A). The data values of the rows 314, 316, 318 are copied to the quarantine table 320 into respective columns 322, 324, 326, 328, 330, 332. The data values of the rows 314, 316, 318 are deleted from the original table 300. The maintenance procedure is performed, and the structure of the table 300 is changed, such that the data type of the column 308 is changed to INT. Accordingly, a revised (target release) table 300' is provided with corresponding revised column 308'. Once the maintenance procedure is complete, the revised table 300' can be put into production use, such that the application can interact with the data values stored therein.

In accordance with implementations of the present disclosure, the data values of column 328 of the quarantine table 320 can be reviewed, and can be edited to be consistent with the data type of corresponding column 308' of the revised table 300'. For example, the data value "5 0" of row 314 can be edited to "50" (i.e., the space between the 5 and the 0 removed), the data value "E" of row 316 can be edited to "3," and the data value "' '" of row 318 can be edited to "0." Accordingly, each of the new data values corresponds to the data type INT required by column 308' of the table 300'. In some examples, the rows including the edited data values are copied to the table 300', as depicted in FIG. 3C, where the rows 314', 316', 318' correspond to the copied rows 314, 316, 318 after editing in the quarantine table 320. After all rows have been edited, and copied to the table 300', the quarantine table 320 can be deleted.

Figure 4A:
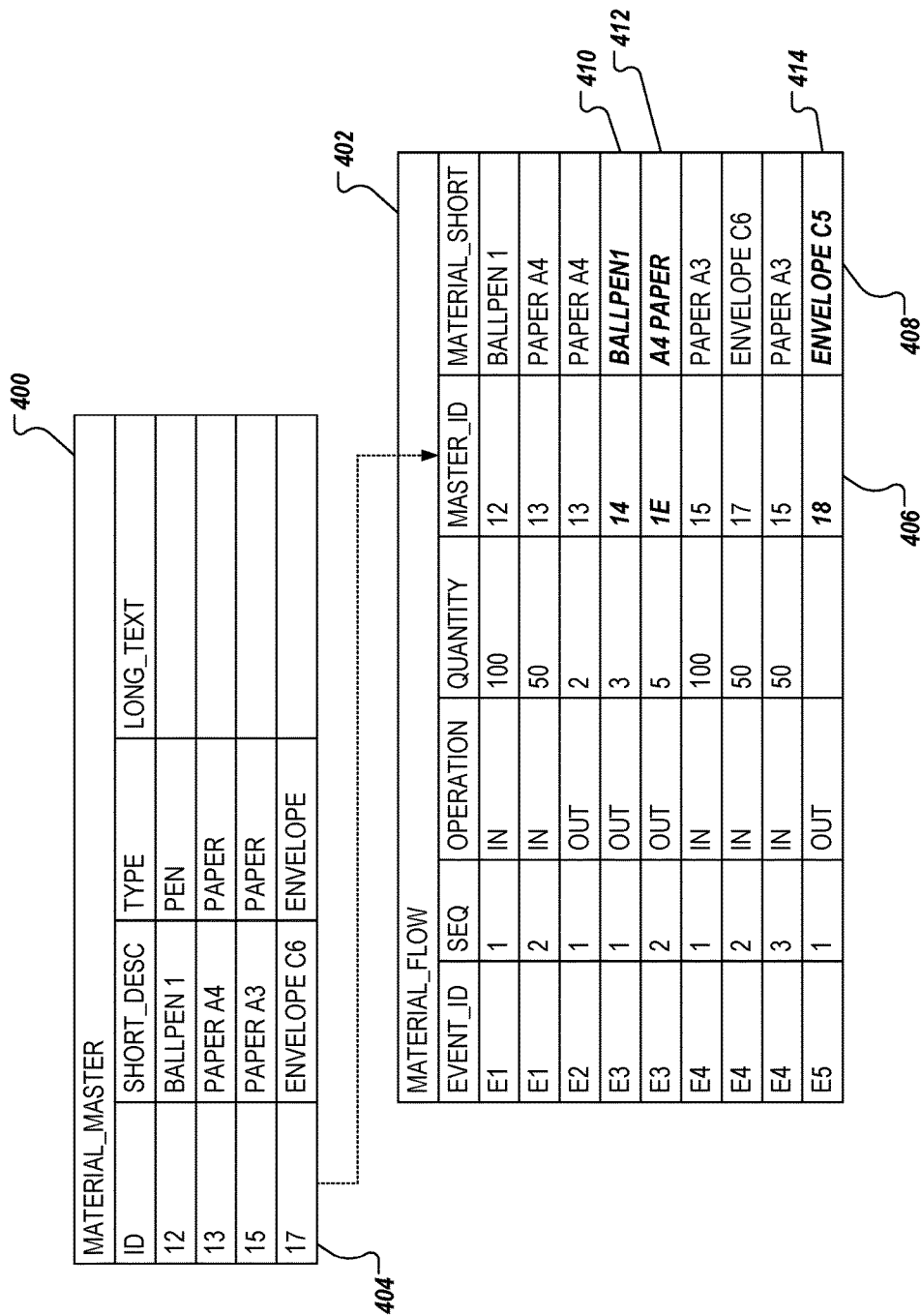
FIGS. 4A-4C depict example tables in accordance with implementations of the present disclosure.
Figure 4B:
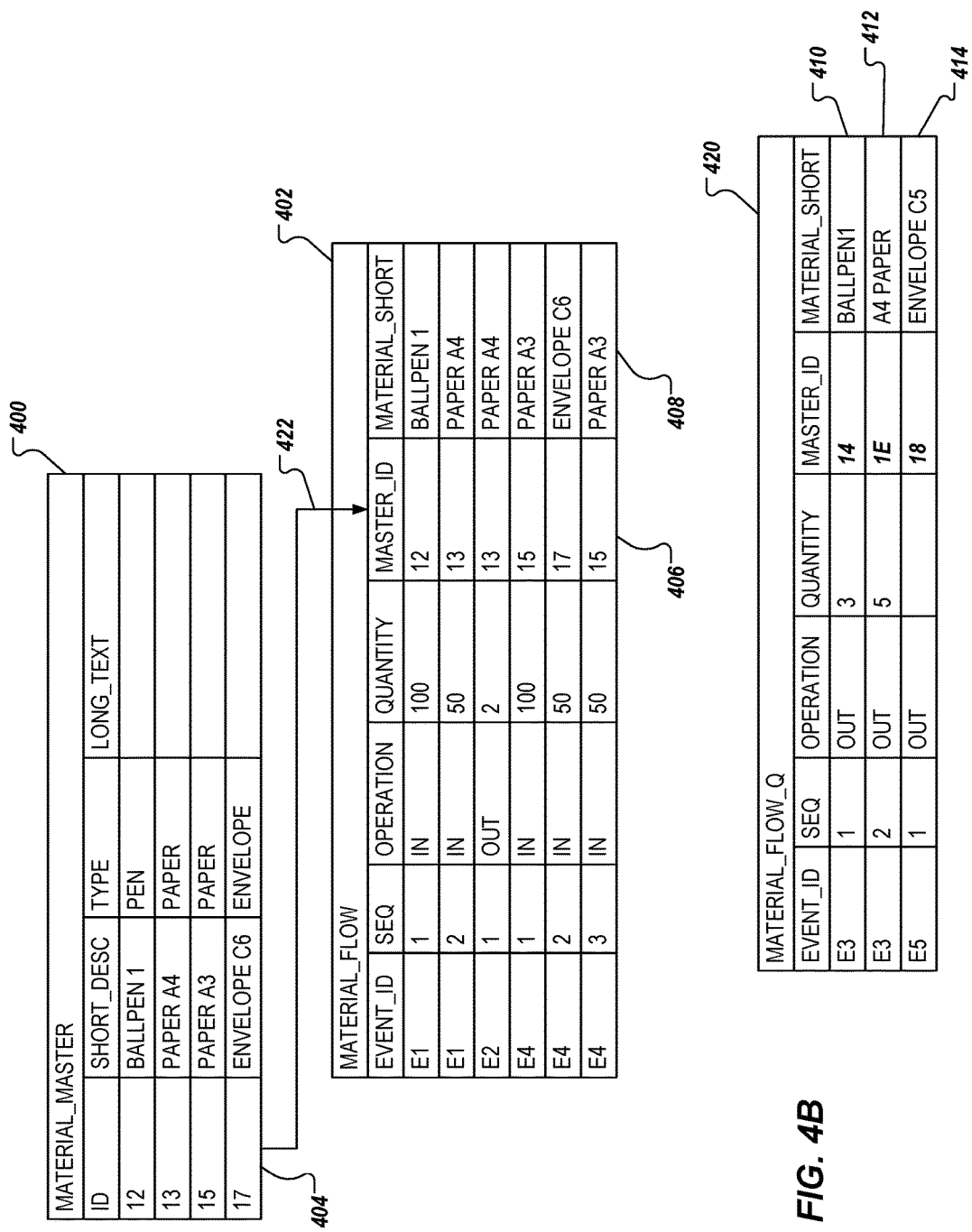
Figure 4C:
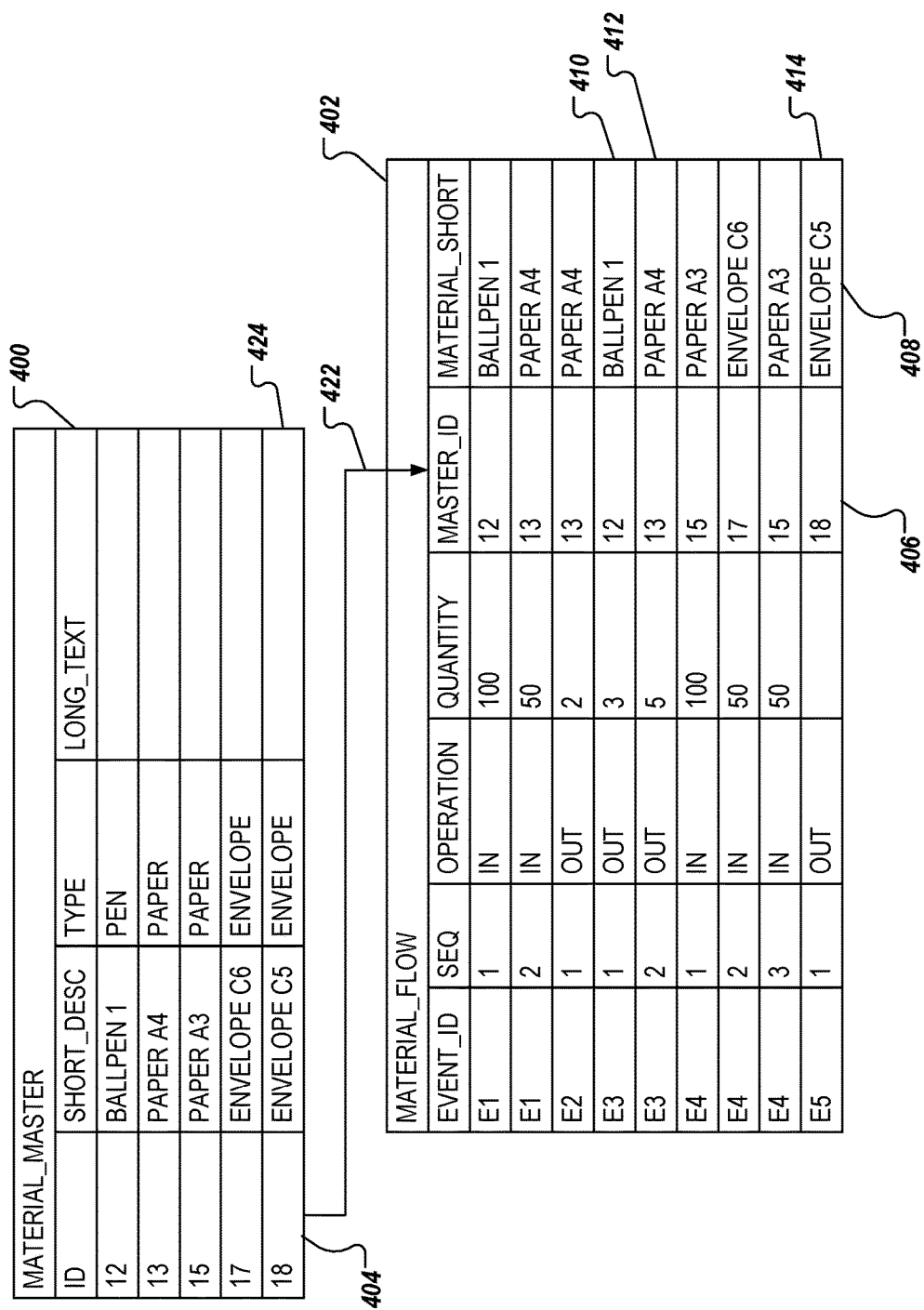

FIGS. 4A-4C depict example (start release) tables 400, 402 in accordance with implementations of the present disclosure. The example table 400 includes a column 404 that provides data values corresponding to identifier numbers. The example table 402 includes a column 406 that provides data values corresponding to identifier numbers, as well as a column 408 that provides data values including short descriptions (e.g., string values).

It can be determined that an application that interacts with the database system, within which the tables 400, 402 are stored is to undergo a maintenance procedure that would result in a FKC between the column 404 of the table 400, and the column 406 of the table 402. In the example of FIG. 4A, it is determined that rows 410, 412, 414 each include data values stored in column 406 that are absent from the column 404, and include data values stored in column 408 that do not correspond to data values of the table 400. Consequently, the data values in rows 410, 412, 414 of and column 406 would violate the FKC once implemented. In view of this, and in accordance with implementations of the present disclosure, a quarantine table can be provided.

FIG. 4B depicts an example quarantine table 420. In some implementations, the quarantine table 420 is created, and mirrors the structure of the original table 402 (of FIG. 4A). The data values of the rows 412, 414, 416 are copied to the quarantine table 420 into respective columns. The data values of the rows 412, 414, 416 are deleted from the original table 402. The maintenance procedure is performed, and a FKC 422 is provided between the table 400 and the table 402, such that the column 404 is keyed to the column 406 (target release). Once the maintenance procedure is complete, the table 400, and the table 402 can be put into production use with the FKC 422, such that the application can interact with the data values stored therein.

In accordance with implementations of the present disclosure, the data values of the quarantine table 420 can be reviewed, and can be edited to be consistent with data values stored in the table 400, and/or a row can be added to the table 400 to add a data value that is included in the quarantine table 420, but not yet included in the table 400. For example, the data value "14" of row 410 can be edited to "12" (i.e., the identifier that corresponds to BALLPEN 1 in the table 400), and the data value "BALLPEN1" can be edited to read "BALLPEN 1" to correspond to the short description provided in the table 400. Further, the data value "1E" of row 412 can be edited to "13" to match the identifier "13" already present in the table 400, and the data value "A4 PAPER" can be edited to "PAPER A4" for consistency with the corresponding short description of the table 400. In some examples, the rows including the edited data values are copied to the table 402, as depicted in FIG. 4C. Continuing, a row 424 is added to the table 400, and the row 414 is copied back to the table 402. After all rows have been edited, and copied to the table, the quarantine table 420 can be deleted.

In some implementations, editing of data values within a quarantine table, copying of edited rows back to the original table, and deletion of the quarantine table can be at least partially automated. For example, and although the examples of FIGS. 3A-3C and 4A-4C include relatively few data values, an original table can include hundreds of thousand, if not millions of data values. Even if a relatively small percentage of those data values is determined to be inconsistent with a constraint that is to be added (or edited) during a maintenance procedure, a resulting quarantine table can include a significant number of data values that may need editing. For example, if a table includes 1,000,000 data values, and 1% are determined to be inconsistent with a to be added (or edited) constraint, a resulting quarantine table will include 10,000 data values that need to be reviewed. Reviewing such a large amount of data values can be time and resource intensive.

In view of this, implementations of the present disclosure enable editing to be at least partially automated. In some examples, a user can edit a data value. In response, it can be determined whether the edited value is consistent with the constraint added (or edited) during the maintenance procedure. If the edited value still is not consistent, an indicator can be displayed to the user, and the user can again edit the data value. If the edited value is consistent, an editing component automatically compares the original value to the edited value, determines the edit that was made, searches the remaining data values in the column for the original value, and replaces any further instances of the original value with the edited value.

In some implementations, a rule can include checking for the same original value, and replacing with the edited value. For example, if the user edits "1E" to "13," and the "13" is consistent with the new/edited constraint, the editing component automatically replaces any other instances of "1E" to "13" in the column. As another example, if the user edits "5 0" to "50," and the "50" is consistent with the new/edited constraint, the editing component automatically edits any other instances of "5 0" to "50" within the column.

In some implementations, rules for automatically editing data values can be more complex. For example, a rule can account for both the edit manually made by the user, as well as the data type assigned to the column. In this manner, different types of errors can be fixed from the same single, manual edit. An example rule can include replacing an original character with an edited character for any data values having the original character within a column having an integer (INT) data type. For example, if the user edits "1E" to "13," and the "13" is consistent with the new/edited constraint, the editing component automatically replaces any other instances of "E" with a "3" in the column. For example, any instances of *E* (where * is a wildcard, or blank) will be replaced with *E* (e.g., "1E4" is replaced with "134," "2E" is replaced with "23," "EE4" is replaced with "334"). Another example rule can include removing spaces between numbers for any data values within a column having an integer (INT) data type. For example, if the user edits "5 0" to "50," and the "50" is consistent with the new/edited constraint, the editing component automatically removes spaces between consecutive digits (e.g., "1 4" is replaced with "14," "2 2" is replaced with "22," "6 4 5" is replaced with "645").

Figure 5:
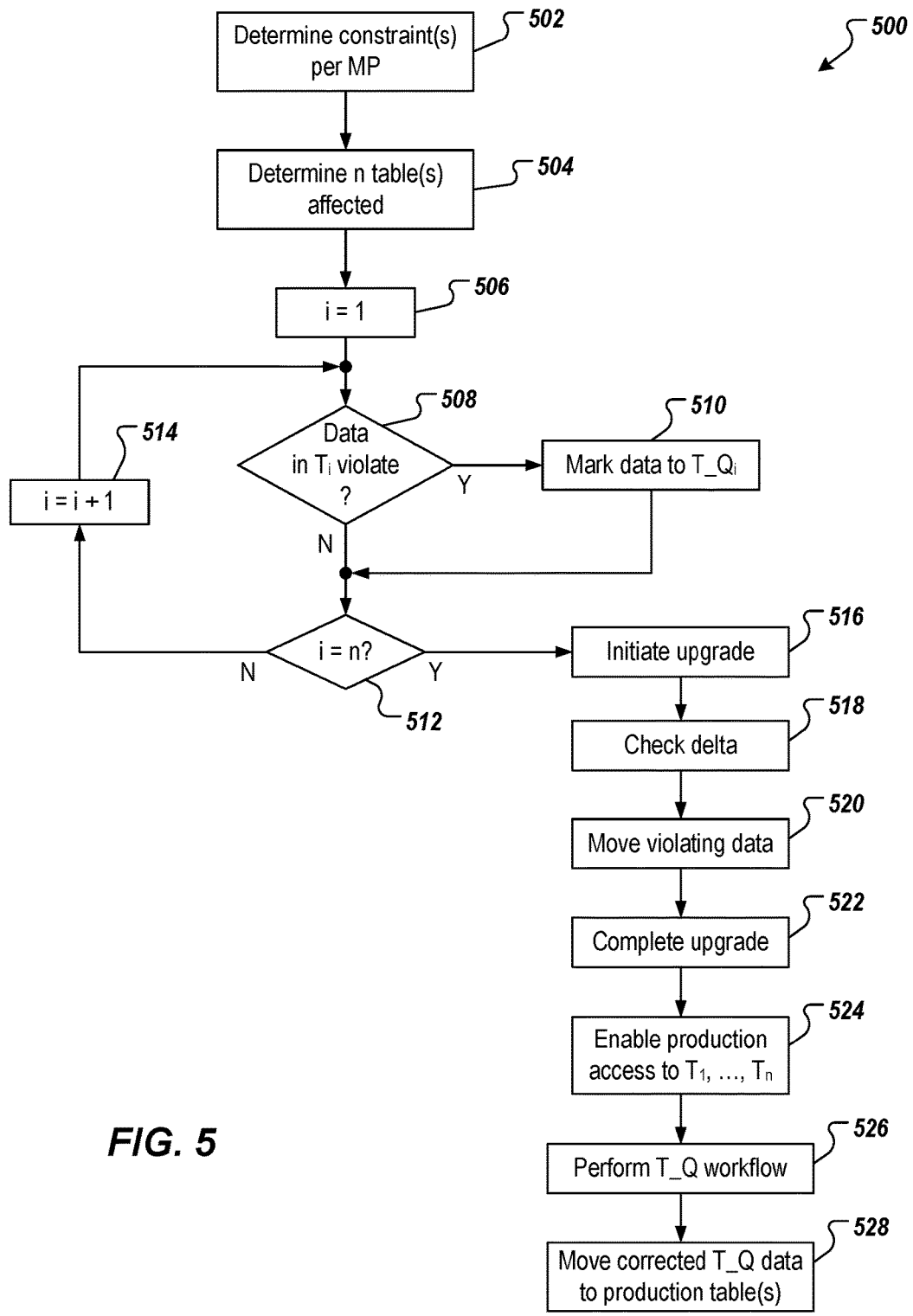
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices.

One or more constraint changes are determined (502). For example, a to-be-performed maintenance procedure (e.g., upgrade) is reviewed to identify one or more constraint changes that would result from the maintenance procedure. One or more tables that would be affected by the to-be-changed one or more constraints are determined (504). For example, a data model is reviewed in view of the to-be-changed constraints to identify a set of tables (e.g., $\mathbb{T} \to$ $\{T_1, \ldots, T_n\}$) that would be affected by a constraint change. For example, a table having a data type change would be affected. As another example, two tables having a new FKC therebetween would be affected. A counter i is set equal to 1 (506).

It is determined whether one or more data values in table $T_i$ would violate a to-be-changed constraint (508). If one or more data values in table $T_i$ would violate a to-be-changed constraint, each of the one or more data values is marked to be moved to a quarantine table $T_{Qi}$. If one or more data values in table $T_i$ would not violate a to-be-changed constraint, or any data values have been marked, it is determined whether the counter i is equal to n (512). That is, it is determined whether all tables in the set of tables have been reviewed. If i is not equal to n, the counter i is incremented (514), and the example process 500 loops back to review the next table in the set of tables.

At some point after the tables in the set of tables have been reviewed, the maintenance procedure is initiated (516). For example, an administrator initiates an upgrade procedure to upgrade an application from a start release (V1) to a target release (V2), which results in the one or more constraint changes to be instituted. A delta is checked (518). For example, any changes to data values in the set of tables that occurred since the initial review of the set of tables (e.g., (502)→(512)) are reviewed to determine whether those data values would violate any of the one or more constraints. If so, each of such data values is marked for move to a quarantine table.

Data objects having data values that would violate a post-upgrade constraint are moved to respective quarantine tables (520). That is, data objects marked for movement during the initial review (e.g., (510)), and/or data objects marked during the delta review (e.g., (518)), are moved to the quarantine table(s), and are deleted from the original (start release) table(s). The upgrade is completed (522). For example, the upgrade is performed to the target release (V2), and the application is brought back online for production use. Accordingly, access to the set of tables (now in target release with changed constraints) is enabled for production use (524).

A workflow is performed on the constraint table(s) (526). For example, a user is able to access data objects of the quarantine tables to edit data values, insert rows, and the like, as described herein. In this manner, the issue that would violate a constraint of the target release can be corrected. In some examples, at least a portion of the editing can be automated, as described herein. The edited data is moved from the quarantine table(s) to the production table(s) (528).

Implementations of the present disclosure provide one or more of the following example advantages. Implementations enable completion of an upgrade procedure on a database, even if existing content violates target release constraints. In operation models, where the technical administrator operating the upgrade (in cloud setup a machine) does not have permission and skill to adjust data in the database to match target release constraint, the tasks can be distributed to technical execution and key-user having context know-how and permission. Further, implementations reduce the risk of an upgrade failing due to tenant individual data, as well as the risk of failing due to general procedure failure, and removes the dependency on the tenant individual content. Implementations limit upgrade execution to a single run, and do not require repetitive execution of the upgrade on changed start release data. In this manner, operational costs, in terms of computing resources, are reduced. Implementations also reduce downtime of the application, because the upgrade is completed without manual actions required during downtime. Instead, any manual actions are asynchronous tasks after the upgrade. Implementations also enable changing constraint and persistency structure in a single upgrade, thus providing more flexibility for the application developer in changing persistency structure.

Figure 6:
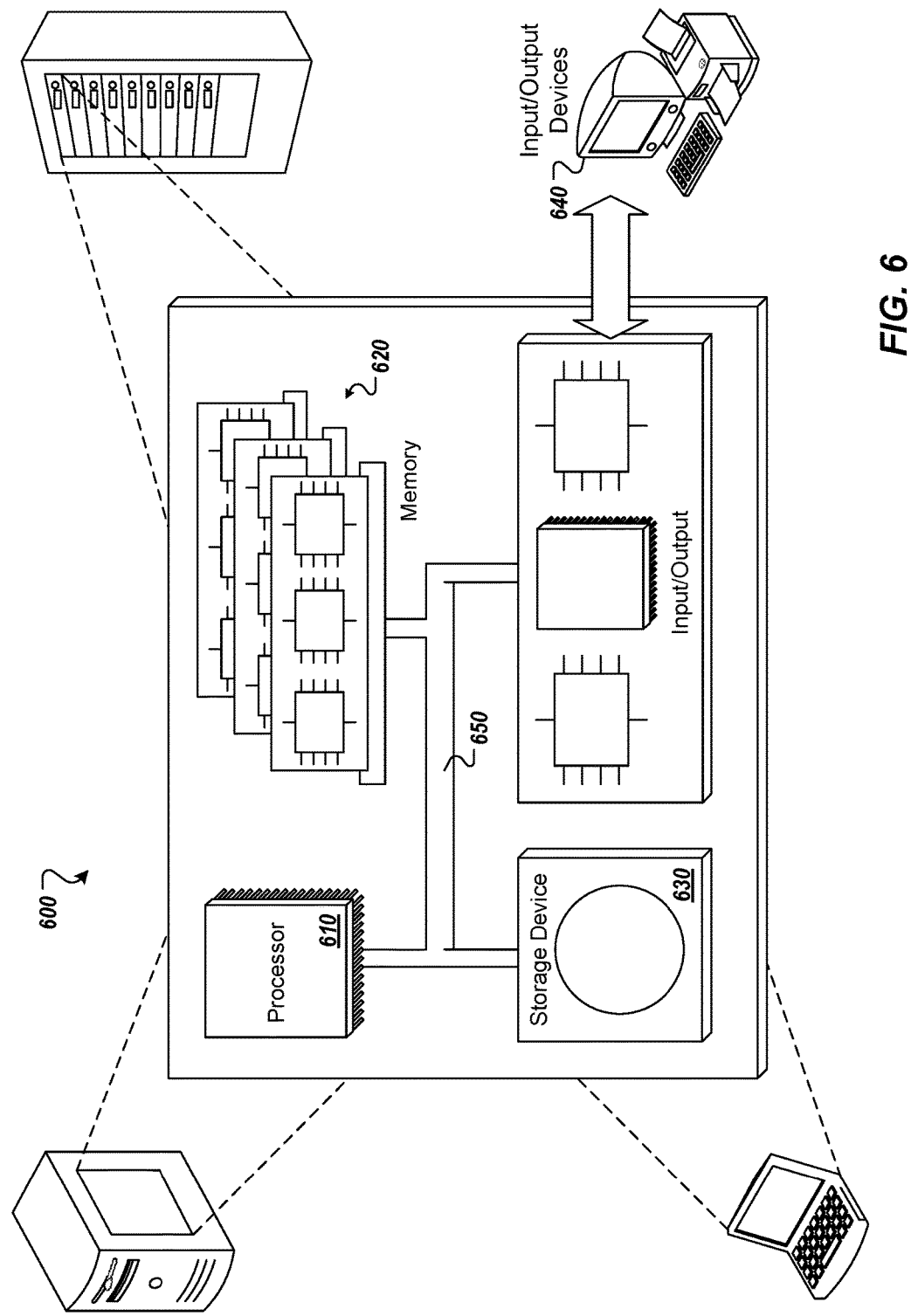
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for supporting maintenance procedures in database systems, the method being executed by one or more processors and comprising:
   determining, by a computer-implemented deploy tool that deploys maintenance procedures in a database system, at least one constraint that is to be changed as a result of a maintenance procedure that is to be performed on an application that interacts with the database system;
   identifying, by the deploy tool, a data value of a table stored in the database as violating the at least one constraint, the table having a start release structure;

copying, by the deploy tool, a data object comprising the data value to a quarantine table that includes the start release structure;

deleting the data object from the table;

editing, by the one or more processors, the data value within the quarantine table to provide an edited data value that does not violate the at least one constraint;

providing the table in a target release structure based on the maintenance procedure; and copying, by the one or more processors, the data object comprising the edited data value to the table, after the maintenance procedure has been performed.

2. The method of claim 1, wherein the at least one constraint comprises one of a data type constraint, and a foreign key constraint.

3. The method of claim 1, wherein editing the data value is automatically executed at least partially based on a manual edit to another data value performed by a user.

4. The method of claim 1, wherein moving a data object to a quarantine table, and editing the data value within the quarantine value are performed before the maintenance procedure is completed, and the application and database system are in production use.

5. The method of claim 1, wherein the at least one constraint results from a change to a data model that defines interactions between the application and the database system.

6. The method of claim 1, wherein the maintenance procedure comprises an upgrade procedure to upgrade the application from a first version to a second version.

7. The method of claim 1, further comprising deleting the quarantine table.

8. A non-transitory computer-readable storage medium coupled to one or more processors and having instructions stored thereon which, when executed by the one or more processors, cause the one or more processors to perform operations for supporting maintenance procedures in database systems, the operations comprising:

determining, by a computer-implemented deploy tool that deploys maintenance procedures in a database system, at least one constraint that is to be changed as a result of a maintenance procedure that is to be performed on an application that interacts with the database system;

identifying, by the deploy tool, a data value of a table stored in the database as violating the at least one constraint, the table having a start release structure;

copying, by the deploy tool, a data object comprising the data value to a quarantine table that includes the start release structure;

deleting the data object from the table;

editing the data value within the quarantine table to provide an edited data value that does not violate the at least one constraint;

providing the table in a target release structure based on the maintenance procedure; and copying the data object comprising the edited data value to the table, after the maintenance procedure has been performed.

9. The computer-readable storage medium of claim 8, wherein the at least one constraint comprises one of a data type constraint, and a foreign key constraint.

10. The computer-readable storage medium of claim 8, wherein editing the data value is automatically executed at least partially based on a manual edit to another data value performed by a user.

11. The computer-readable storage medium of claim 8, wherein moving a data object to a quarantine table, and editing the data value within the quarantine value are performed before the maintenance procedure is completed, and the application and database system are in production use.

12. The computer-readable storage medium of claim 8, wherein the at least one constraint results from a change to a data model that defines interactions between the application and the database system.

13. The computer-readable storage medium of claim 8, wherein the maintenance procedure comprises an upgrade procedure to upgrade the application from a first version to a second version.

14. The computer-readable storage medium of claim 8, wherein operations further comprise deleting the quarantine table.

15. A system, comprising:

a computing device; and a computer-readable storage device coupled to the computing device and having instructions stored thereon which, when executed by the computing device, cause the computing device to perform operations for supporting maintenance procedures in database systems, the operations comprising:

determining, by a computer-implemented deploy tool that deploys maintenance procedures in a database system, at least one constraint that is to be changed as a result of a maintenance procedure that is to be performed on an application that interacts with the database system;

identifying, by the deploy tool, a data value of a table stored in the database as violating the at least one constraint, the table having a start release structure;

copying, by the deploy tool, a data object comprising the data value to a quarantine table that includes the start release structure;

deleting the data object from the table;

editing the data value within the quarantine table to provide an edited data value that does not violate the at least one constraint;

providing the table in a target release structure based on the maintenance procedure; and copying the data object comprising the edited data value to the table, after the maintenance procedure has been performed.

16. The system of claim 15, wherein the at least one constraint comprises one of a data type constraint, and a foreign key constraint.

17. The system of claim 15, wherein editing the data value is automatically executed at least partially based on a manual edit to another data value performed by a user.

18. The system of claim 15, wherein moving a data object to a quarantine table, and editing the data value within the quarantine value are performed before the maintenance procedure is completed, and the application and database system are in production use.

19. The system of claim 15, wherein the at least one constraint results from a change to a data model that defines interactions between the application and the database system.

20. The system of claim 15, wherein the maintenance procedure comprises an upgrade procedure to upgrade the application from a first version to a second version.

\* \* \* \* \*